United States Patent [19]
Toth

[11] Patent Number: 5,063,642
[45] Date of Patent: Nov. 12, 1991

[54] QUICK RELEASE BAND CLAMP

[76] Inventor: Andras Toth, 24171 Dan Apt. 104B, Mt. Clemens, Mich. 48043

[21] Appl. No.: 511,308

[22] Filed: Apr. 19, 1990

[51] Int. Cl.$^5$ .............................................. B65D 63/00
[52] U.S. Cl. ................................ 24/274 R; 24/274 P; 24/279
[58] Field of Search ................. 24/274 R, 274 P, 279, 24/19, 20 R, 20 S

[56]  References Cited
U.S. PATENT DOCUMENTS

| | | | |
|---|---|---|---|
| 2,189,172 | 2/1940 | Hathorn | 24/274 P |
| 2,268,211 | 12/1941 | Hathorn | 24/274 P |
| 2,689,998 | 9/1954 | O'Shei | 24/274 R |
| 3,189,968 | 6/1965 | Henning | 24/274 P |
| 3,914,832 | 10/1975 | Petrus | 24/274 R |
| 4,445,254 | 5/1984 | Allert | 24/274 R |

FOREIGN PATENT DOCUMENTS

| | | | |
|---|---|---|---|
| 928736 | 12/1947 | France | 24/274 P |
| 1484749 | 6/1967 | France | 24/274 P |
| 607598 | 9/1948 | United Kingdom | 24/274 P |

*Primary Examiner*—Victor N. Sakran
*Attorney, Agent, or Firm*—Remy J. VanOphem

[57] ABSTRACT

A quick release band clamp having a mounting bracket attached to one end of a flexible band. The mounting bracket has a pair of side support members straddling the flexible band. A pivoting bracket is pivotably supported between the pair of side support members by a pair of transverse trunnions and is pivotable between a closed position and an opened position. A worm screw is rotatably supported by the pivoting bracket at a location intermediate the trunnions and the band clamp. The free end of the band clamp is receivable between the mounting bracket and the pivoting bracket. The helical threads of the worm screw engage the teeth provided on the free end of the flexible band when the pivoting bracket is rotated to the closed position. In this position, the flexible band may be advanced through the mounting bracket by the rotation of the worm screw to tighten the flexible band about an object. The free end of the flexible band may be released by pivoting the pivoting bracket to the opened position in which the helical thread of the worm screw is disengaged from the teeth provided in the flexible band.

20 Claims, 1 Drawing Sheet

QUICK RELEASE BAND CLAMP

BACKGROUND OF THE INVENTION

1. Field of the Invention

The invention is related to screw actuated band clamps and in particular to a quick release screw actuated band clamp.

2. Description of the Prior Art

Band clamps of the type having a worm screw engaging teeth or slots provided in an overlapping free end of a flexible band are well known in the art. Hathorn, in U.S. Pat. Nos. 2,189,172 and 2,268,211, discloses a quick release band clamp in which the worm screw and its supporting bracket are pivotably attached to a mounting bracket which in turn is connected to one end of a flexible band. In a closed or locked position, the worm screw engages the teeth provided in the free end of the flexible band. In the open or release position, the worm screw and its associated support are pivoted away from the free end of the flexible band. In U.S. Pat. No. 2,189,172, Hathorn teaches the use of a cotter pin or lock wire inserted through an aperture provided in the head of the worm screw to lock the worm screw and its support in the closed position. In U.S. Pat. No. 2,268,211, Hathorn teaches the use of detents or lugs which are received below an extension provided on the mounting bracket to lock the worm screw and its support structure in a closed position.

In a like manner, Swiss Patent 561,382 teaches the use of an extension at the rear of the mounting bracket or slots captivating the support bracket in the closed position. In an alternate embodiment, O'Shei, in U.S. Pat. No. 2,689,998, teaches a detachable locking mechanism in which the worm screw and its associated support structure are locked in the closed position by the forward end of the support member engaging the outer surface of the flexible band.

SUMMARY OF THE INVENTION

The invention is a quick release band clamp having a mounting bracket which has a pair of spatially separated side support members and a pivoting bracket disposed between the pair of spatially separated side support members. The pivoting bracket has a top portion, a transverse front portion extending from one end of the top portion, and a transverse rear portion extending from the other end of the top portion. The rear portion of the pivoting bracket has a pair of trunnions which pivotably connect the pivoting bracket to the mounting bracket, the pivoting bracket being pivotable between a closed position and an open position. A flexible band has a fixed end portion attached to the mounting bracket and a free end portion slidably received between the pair of spatially separated side support members in an overlapping arrangement with the fixed end of the flexible band. The free end portion of the flexible band has a plurality of teeth. A worm screw is rotatably attached to the pivoting bracket between the front and rear portions. The worm screw is disposed generally parallel to the top portion and is displaced from the top portion by a distance greater than the distance between the top portion and the pair of trunnions, and has a helical thread engagable with the teeth provided in the free end portion of the flexible band when the pivoting bracket is in the closed position. Means are also provided to facilitate rotation of the worm screw.

In a preferred embodiment, the pivoting bracket has a pair of transverse tabs extending from the sides of the top portion which are received in a pair of rectangular notches provided in the pair of spatially separated side support members. The tabs define the location of the pivoting bracket in the closed position and prevent excessive longitudinal forces from being applied to the trunnions during tightening of the band clamp.

The object of the invention is a band clamp which may be released quickly without having to completely unscrew the free end portion of the flexible band.

Another object of the invention is a band clamp in which the worm screw is pivotable between a first position in which it engages the teeth provided in the free end portion of the flexible band and a second position in which the worm screw is disengaged from the teeth of the free end portion of the flexible band.

Another object of the invention is to pivot the bracket which rotatably supports the worm screw at a location above the axis of the worm screw to provide a torque as a result of tightening the flexible band which maintains the worm screw in contact with the teeth of the flexible band.

Still another object of the invention is to provide a stop which defines the closed position of the pivoting bracket and prevents excessive transverse forces from being applied between the worm screw and the teeth of the flexible band which would bind the worm screw and damage the flexible band's teeth.

These and other objects of the invention will become more apparent from a reading of the specification in conjunction with the drawings.

DETAILED DESCRIPTION OF THE PREFERRED EMBODIMENT

Figure 1:
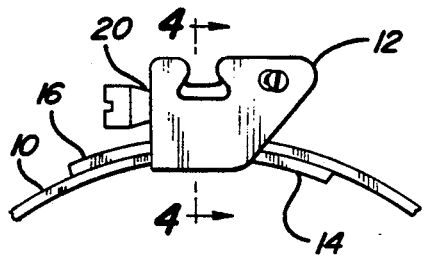
FIG. 1 is a partial side view of the quick release band clamp in the closed position.
Figure 2:
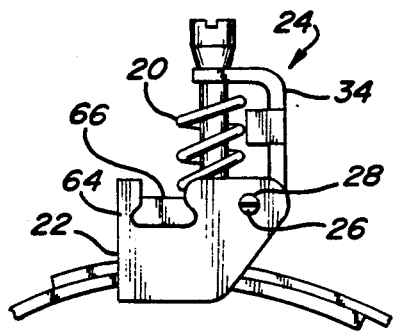
FIG. 2 is a partial side view of the quick release band clamp in the opened position.

A quick release band clamp assembly is shown in FIGS. 1 through 8. The quick release band clamp includes a flexible band 10 and a quick release locking mechanism 12 attached to a fixed end portion 14 thereof. As shown in FIGS. 1 and 2, the flexible band 10 may be bent so that a free end portion 16 may be inserted through the quick release locking mechanism 12 and overlap the fixed end portion 14 to which the quick release locking mechanism 12 is attached. The free end portion 16 of the flexible band 10 has a plurality of transverse teeth or slots 18 which are engagable by a worm screw 20. The transverse teeth or slots 18 are preferably disposed at an angle to the edges of the flexible band 10 which corresponds to the pitch of the worm screw 20.

Figure 6:
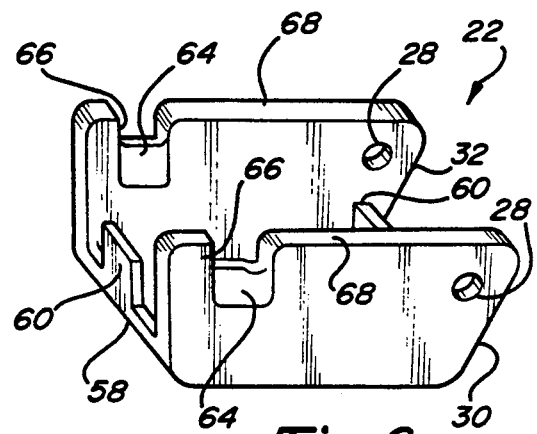
FIG. 6 is a perspective view of the mounting bracket 22.

As shown more clearly in FIGS. 2 and 6, the quick release locking mechanism 12 consists of a mounting bracket 22 which is fixedly attached to the fixed end portion 14 of the flexible band 10 and a screw assembly 24 pivotably attached to the mounting bracket 22 by a pair of trunnions 26 received in a pair of apertures 28 passing through side support members 30 and 32 of the mounting bracket 22.

Figure 5:
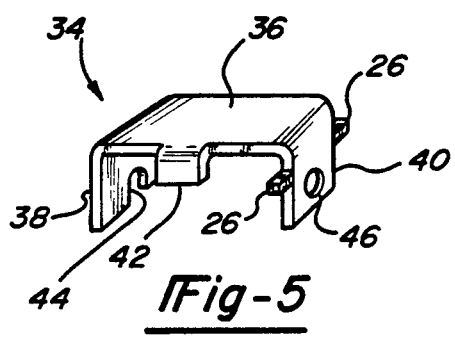
FIG. 5 is a perspective view of the pivoting bracket 34.

The mounting bracket 22 may be formed integral with the flexible band 10 or may be formed as a separate element attached to the flexible band 10 by mounting tabs, welding or any other method known in the art. The screw assembly 24 consists of the worm screw 20 rotatably attached to a pivoting bracket 34. As shown in FIG. 5, the pivoting bracket 34 has a substantially flat top portion 36, a transverse front leg portion 38 extending from one end of the flat top portion 36, and a transverse rear leg portion 40 extending from the other end of the flat top portion 36. The front leg portion 38 and the rear leg portion 40 are substantially parallel to each other and are normal to the surface of the flat top portion 36. The pivoting bracket 34 also has a pair of side tabs 42 which extend from the opposite sides of the flat top portion 36 intermediate the front leg portion 38 and the rear leg portion 40 as shown. The front leg portion 38 has an open end screw mounting slot 44 in which is received one end of the worm screw 20. The rear leg portion 40 has a centrally disposed screw mounting aperture 46 which rotatably supports the end of the worm screw 20. The screw mounting aperture 46 is offset from the pair of trunnions 26, which protrude from opposite sides of the rear leg portion 40, in a direction away from the flat top portion 36 so that the forces of the tightened flexible band 10 acting on the worm screw 20 are applied to the rear leg portion 40 of the pivoting bracket 34 at a point intermediate the pair of trunnions 26 and the flexible band 10. This force produces a torque about the pair of trunnions 26 which urges the pivoting bracket 34 to rotate in a direction towards the flexible band 10. This torque further produces a force which maintains the teeth of the worm screw 20 engaged in the transverse slots 18 of the flexible band 10. The side tabs 42 limit the displacement of the pivoting bracket 34 towards the flexible band 10 thereby preventing the force of the torque generated during tightening of the flexible band 10 from being fully applied to the worm screw 20 in a direction normal to the worm screw 20 which would cause a binding of the worm screw 20 and possible damage to the teeth provided at the free end portion 16 of the flexible band 10.

Figure 7:
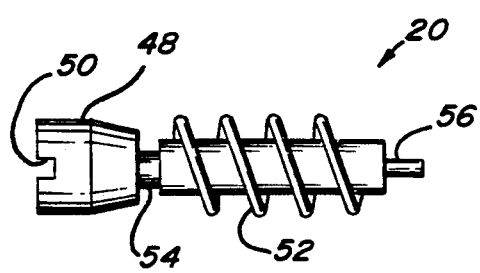
FIG. 7 is a side view of the worm screw 20.

The worm screw 20, as shown in FIG. 7, has a head 48 providing a means by which the worm screw 20 may be rotated. The head 48 may have a screw driver slot 50 as shown or may have a square or hexagonal shape so that it may be rotated by a wrench or other appropriate tool. The worm screw 20 has a helical thread 52 which engages the transverse slots 18 in the flexible band 10, an annular retainer groove 54 which is received in the screw mounting slot 44 of the pivoting bracket 34, and a reduced diameter spindle 56 received in the screw mounting aperture 46 of the rear leg portion 40. The worm screw 20 is attached to the pivoting bracket 34 by inserting the spindle 56 in the screw mounting aperture 46 of the rear leg portion 40 and the annular retainer groove 54 in the screw mounting slot 44 of the front leg portion 38. The open end of the screw mounting slot 44 is preferably partially closed to captivate the worm screw 20 by staking, swagging, or any other method known in the art.

Figure 8:
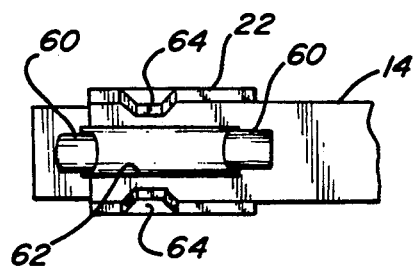
FIG. 8 is a top view of the mounting bracket 22 with the pivoting bracket removed.

The details of the mounting bracket 22 are shown in FIGS. 2, 4, 6, and 8. The mounting bracket 22 includes the side support members 30 and 32, as previously described, which straddle the flexible band 10. The side support members 30 and 32 are connected to each other by a base portion 58 which is attachable to the fixed end portion 14 of the flexible band 10. The base portion 58 of the mounting bracket 22 is preferably curved to mate with the curvature of the flexible band 10. As shown in FIGS. 6 and 8, the base portion 58 may have a pair of transverse locking tabs 60 provided at its opposite ends between the side support members 30 and 32 which are received through a longitudinal slot 62 provided in the fixed end portion 14 of the flexible band 10. The locking tabs 60 may then be crimped down as shown in FIG. 8 to lock the mounting bracket 22 to the flexible band 10. Alternatively, the locking tabs 60 may be received individually through a pair of spatially separated transverse slots 18 provided in the fixed end portion 14 of the flexible band 10 rather than a single longitudinal slot 62 as shown. In FIG. 8, the screw assembly 24 is removed to more clearly show the details of the locking tabs 60 in the longitudinal slot 62.

Figure 4:
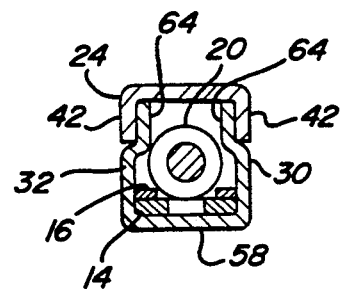
FIG. 4 is a cross-sectional end view taken along section line 4—4 of FIG. 1.
Figure 3:
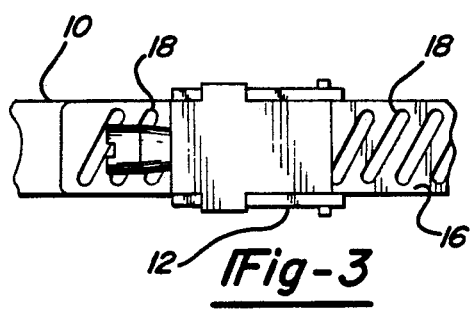
FIG. 3 is a top view of the quick release band clamp.

Each side support member 30 and 32 of the mounting bracket 22 has a rectangular detent 64 in which one of the side tabs 42 is received when the pivoting bracket 34 is in the closed position as shown in FIGS. 1, 3, and 4. A rectangular notch 66 is provided at the upper edge of each rectangular detent 64 which receives the side tabs 42. The rectangular notches 66 determine the closed position of the pivoting bracket 34. Preferably, the flat top portion 36 of the pivoting bracket 34 is flush with an upper surface 68 of the side support members 30 and 32 when the screw assembly 24 is in the closed position as shown in FIGS. 1 and 4. The insertion of the side tabs 42 in the rectangular notch 66 also inhibits the longitudinal translation of the pivoting bracket 34 relative to the mounting bracket 22 and prevents bending or other deformation of the pair of trunnions 26 in the event the clamp is subjected to high tightening loads.

The flexible band 10 is preferably made from a high strength metal alloy, such as steel, but may be made from other types of metals or alloys as well as plastic materials. Likewise, the mounting bracket 22, the worm screw 20 and the pivoting bracket 34 may be made from a structural plastic material. The plastic parts may be molded or extruded using technology well known in the art.

In operation, the flexible band 10 is wound around a hose or other member to be clamped. The locking mechanism 12 is placed in its open position as shown in FIG. 2 and the free end portion 16 of the flexible band 10 is threaded through the locking mechanism 12 between the fixed end portion 14 of the flexible band 10 and the screw assembly 24. The screw assembly 24 is then closed as shown in FIG. 1 and the helical thread 52 of the worm screw 20 engages several of the transverse slots 18 provided in the free end portion 16 of the flexible band 10. The worm screw 20 is then rotated to advance the free end portion 16 of the flexible band 10 through the quick release locking mechanism 12. As the flexible band 10 tightens around the hose, the worm screw 20 produces a force on the pivoting bracket 34 intermediate the pair of trunnions 26 and the base portion 58 of the mounting bracket 22. This force, as previously described, produces a torque urging the pivoting bracket 34 and the attached worm screw 20 to pivot towards the free end portion 16 of the flexible band 10.

This torque is sufficient to keep the threads of the worm screw 20 engaged in the transverse slots 18 and maintains the side tabs 42 in the rectangular notches 66 locking the screw assembly 24 in its closed position.

The quick release band clamp may be released by rotating the worm screw 20 in the opposite direction to reduce the torque being applied to the screw assembly 24 by the worm screw 20. The screw assembly 24 may then be pivoted by hand to the open position as shown in FIG. 2, disengaging the threads of the worm screw 20 from the transverse slots 18 provided in the flexible band 10. Alternatively, the quick release band clamp may be released by prying the head 48 of the worm screw 20 or the pivoting bracket 34 with a screw driver or similar tool to disengage the threads of the worm screw 20 from the transverse slots 18 in the flexible band 10. After the threads of the worm screw 20 are disengaged from the transverse slots 18 in the flexible band 10, the flexible band 10 may then be pulled out of the locking mechanism 12 and the quick release band clamp removed without having to disconnect the hose from the component from which it was clamped.

It is not intended that the invention be limited to the specific embodiment shown in the drawings and as discussed in the specification. It is known that others skilled in the art may make certain modifications to the elements of the quick release band clamp within the scope of the invention as set forth in the appended claims.

What is claimed is:

1. A quick release band clamp comprising:
   a mounting bracket having a pair of spatially separated side support members attached in a longitudinal direction to said mounting bracket, each of said spatially separated side support members having a circular aperture disposed therein, said circular apertures being symmetrically positioned on said spatially separated side support members in relation to each other;
   a pivoting bracket pivotally disposed between said pair of spatially separated side support members, said pivoting bracket having a top portion, a front leg portion extending from one end of said top portion and a rear leg portion extending from the other end of said top portion, said rear leg portion having a pair of trunnions disposed adjacent to said top portion which pivotably engage said circular apertures so as to connect said pivoting bracket to said mounting bracket, said pair of trunnions and said circular apertures cooperating to substantially prevent longitudinal displacement of said pivoting bracket in relation to said mounting bracket, said pivoting bracket being pivotable between an open position and a closed position;
   a flexible band having a fixed end portion attached to said mounting bracket and a free end portion slidably receivable under said pivoting bracket and between said pair of spatially separated side support members of said mounting bracket, said free end portion having a plurality of transverse teeth; and
   a worm screw rotatably attached to said pivoting bracket between said front and rear leg portions, said worm screw being disposed generally parallel to said top portion and displaced from said top portion a distance greater than the distance said pair of trunnions are displaced from said top portion, said worm screw having a helical thread engagable with said plurality of transverse teeth provided in said free end portion of said flexible band when said pivoting bracket is in said closed position and means for rotating said worm screw.

2. The band clamp of claim 1 wherein each side support member of said pair of spatially separated side support members has a notch adjacent said top portion of said pivoting bracket and wherein said top portion of said pivoting bracket has a pair of transverse tabs, one transverse tab of said pair of transverse tabs extending from each side thereof, each transverse tab of said pair of transverse tabs being receivable in a respective one of said notches when said pivoting bracket is in said closed position to limit the rotational displacement of said pivoting bracket in said closed position.

3. The band clamp of claim 2 wherein each transverse tab of said pair of transverse tabs has an end portion which extends beyond said slots and wherein said end portions are folded to extend parallel to said pair of spatially separated side support members and to captivate said pair of spatially separated side support members therebetween.

4. The band clamp of claim 3 wherein a detent is provided in each said side support member of said pair of spatially separated side support members adjacent to said notch and wherein said end portions of said pair of transverse tabs are received in said detents.

5. The band clamp of claim 1 wherein said front leg portion of said pivoting bracket has a screw mounting slot which has an open end and said rear leg portion has a screw mounting aperture, wherein said worm screw has a spindle provided at one end which is received in said screw mounting aperture and an annular retainer groove provided at the other end of said worm screw received in said screw mounting slot through said open end and secured therein.

6. The band clamp of claim 5 wherein said means for rotating said worm screw is a head provided in the end of said worm screw opposite said spindle which is slotted to receive a screw driver.

7. The band clamp of claim 5 wherein said open end of said screw mounting slot is deformable to secure said annular retainer groove of said worm screw in said screw mounting slot.

8. The band clamp of claim 1 wherein said helical thread of said worm screw has a predetermined pitch and wherein said plurality of transverse teeth provided in said flexible band are a plurality of slots provided through said flexible band, said plurality of slots being disposed at an angle corresponding to said predetermined pitch.

9. A quick release band clamp comprising:
   a flexible band having a fixed end portion and a free end portion having a plurality of teeth;
   a mounting bracket attached to said fixed end portion of said flexible band, said mounting bracket having a side support member longitudinally disposed on each side of said flexible band, each side support member having a circular pivot aperture disposed adjacent to one end thereof, said free end portion of said flexible band being receivable between said side support members intermediate said circular pivot apertures and said fixed end portion of said flexible member;
   a pivoting bracket disposed between said side support members, said pivoting bracket having a top portion, a transverse front portion extending from one end of said top portion and a transvers rear portion extending from the other end of said top portion, said transverse front and rear portions being generally parallel to each other and perpendicular to said top portion, said transverse rear portion having a pair of transverse trunnions extending into said circular pivot apertures which pivotally connect said pivoting bracket to said mounting bracket, said pair of transverse trunnions and said circular pivot apertures cooperating to substantially prevent longitudinal displacement of said pivoting bracket in relation to said mounting bracket, said pivoting bracket being pivotable between a closed position and an open position; and a worm screw rotatably attached to said pivoting bracket parallel to said top portion between said transverse front portion and said transverse rear portion, said worm screw being disposed generally parallel to said top portion and displaced from said top portion a distance greater than the distance said pair of transverse trunnions are displaced from said top portion, said worm screw having a helical thread engagable with said plurality of teeth provided in said flexible band when said pivoting bracket is in said closed position and means for rotating said worm screw to advance said free end portion of said flexible band through said side support members.

10. The band clamp of claim 9 wherein a notch is provided in each of said side support members along an edge adjacent to said top portion of said pivoting bracket when said pivoting bracket is in said closed position and wherein said pivoting bracket has a pair of tabs transversely extending from said top portion receivable in said notch provided in said side support members to define the position of said pivoting bracket in said closed position.

11. The band clamp of claim 10 wherein each said transverse tab has an end portion which extends transversely beyond said notches and wherein said end portions are bent to extend parallel to said side support members and captivate said side support members therebetween.

12. The band clamp of claim 11 wherein a detent is provided in each of said side support members adjacent to said notch and wherein said end portions of said transverse tabs are received in said detents.

13. The band clamp of claim 9 wherein said worm screw has a spindle provided at one end and an annular retainer groove provided near the other end, wherein said transverse rear portion of said pivoting bracket has a screw mounting aperture in which said spindle is rotatably supported, said transverse front portion has a screw mounting slot in which said annular retainer groove is rotatably supported.

14. The band clamp of claim 13 wherein said screw mounting slot has an open end through which said annular retainer groove is inserted into said screw mounting slot, said open end being deformed to secure said annular retainer groove in said screw mounting slot.

15. The band clamp of claim 9, wherein said worm screw has a helical thread and said helical thread has a predetermined pitch, said plurality of teeth provided in said free end of said flexible band are a plurality of slots provided in said flexible band, said plurality of slots being disposed at an angle corresponding to said predetermined pitch of said helical thread.

16. A quick release locking mechanism for a band clamp having a flexible band which has a fixed end portion and a free end portion having a plurality of teeth, said quick release locking mechanism comprising:

a mounting bracket having a base portion attached to said fixed end portion of said flexible band and a pair of spatially separated side support members extending normal to said base portion and oriented in a longitudinal direction of said mounting bracket, one on each side of said flexible band, said free end portion of said flexible band being receivable between said pair of spatially separated side support members in an overlapping relationship with said fixed end portion;

a pivoting bracket disposed between said pair of spatially separated side support members, said pivoting bracket having a top portion, a transverse front portion extending from a front edge of said top portion and a transverse rear portion extending from a rear edge of said top portion, said transverse front and rear portions extending substantially perpendicular to said top portion;

means for pivotably connecting said pivoting bracket to said mounting bracket at a predetermined distance from said base portion of said mounting bracket, said means for pivotably connecting said pivoting bracket substantially preventing longitudinal displacement of said pivoting bracket in relation to said mounting bracket, said pivoting bracket being pivotable from a closed position in which said pivoting bracket is substantially parallel to said mounting bracket to an open position displaced from said closed position; and a worm screw rotatably supported at a location intermediate said means for pivotably connecting said pivoting bracket and said base portion of said mounting bracket, said worm screw being rotatably supported by said transverse rear portion of said pivoting bracket at one end and by said transverse front portion of said pivoting bracket at an end opposite said one end, said worm screw having a helical thread engagable with said plurality of teeth of said free end portion of said flexible band when said pivoting bracket is in said closed position and means extending through said transverse front portion of said pivoting bracket for facilitating the rotation of said worm screw.

17. The quick release locking mechanism of claim 16 wherein each side support bracket of said pair of spatially separated side support members has an upper edge opposite said base portion, wherein said upper edge of each side support member has a rectangular notch provided therein, and wherein said top portion of said pivoting bracket has a pair of transverse tabs, a respective transverse tab being received in a respective rectangular notch when said pivoting member is in said closed position.

18. The quick release locking mechanism of claim 17 wherein each transverse tab of said pair of transverse tabs has an end portion extending parallel to said side support members captivating said pair of side support members therebetween.

19. The quick release locking mechanism of claim 18 wherein each side support member of said pair of spatially separated side support members has a detent adjacent to said rectangular notch and wherein said end portions of said transverse tabs are received in said detents.

20. The quick release locking mechanism of claim 16 wherein said means for pivotably connecting said pivoting bracket comprises a pair of trunnions extending from said transverse rear portion of said pivoting bracket and a pair of circular trunnion apertures provided in said pair of spatially separated side support members in which said pair of trunnions are pivotably received, said pair of trunnions being sized to closely fit said circular trunnion apertures so as to substantially prevent longitudinal displacement of said pivoting bracket in relation to said mounting bracket.

* * * * *

UNITED STATES PATENT AND TRADEMARK OFFICE
CERTIFICATE OF CORRECTION

PATENT NO. : 5,063,642
DATED : November 12, 1991
INVENTOR(S) : Andras Toth

It is certified that error appears in the above-identified patent and that said Letters Patent is hereby corrected as shown below:

Column 1, line 61, delete ":" and insert --.--.

Column 3, line 38, delete ":" and insert --.--.

Column 8, line 54, delete "member" and insert ---- bracket ----.

Column 6, line 68, delete "transvers" and insert ---- transverse ----.

Signed and Sealed this

Ninth Day of March, 1993

Attest:

STEPHEN G. KUNIN

Attesting Officer

Acting Commissioner of Patents and Trademarks